W. A. RIDDELL.
FOCUSING DEVICE FOR CAMERAS.
APPLICATION FILED OCT. 20, 1915.
1,210,534.
Patented Jan. 2, 1917.
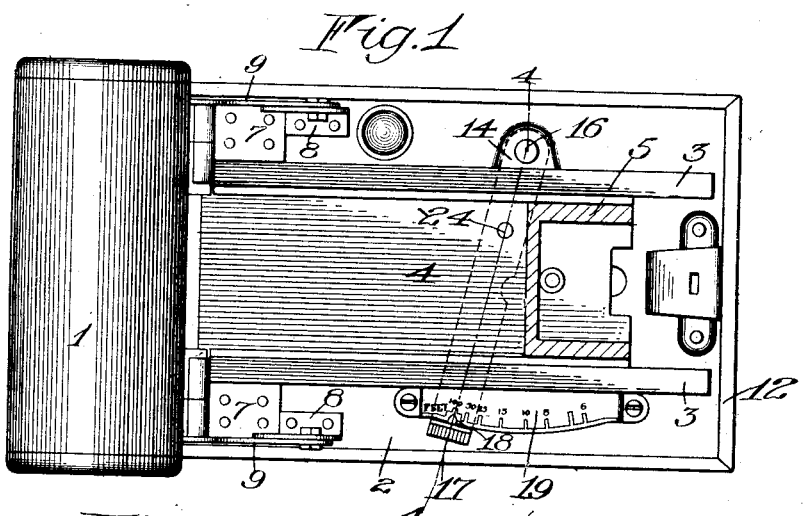
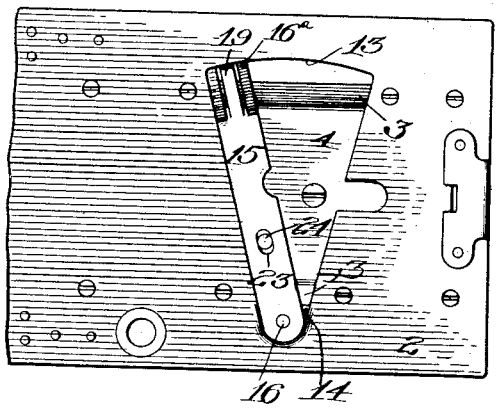
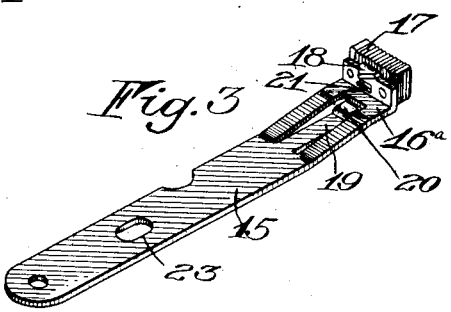
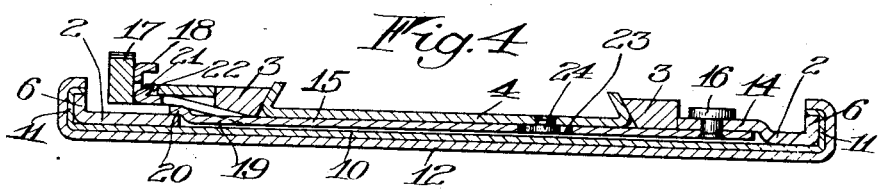
WITNESSES:
INVENTOR
William A. Riddell
BY
his ATTORNEYS

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

FOCUSING DEVICE FOR CAMERAS.

1,210,534.     Specification of Letters Patent.     Patented Jan. 2, 1917.

Application filed October 20, 1915. Serial No. 56,947.

*To all whom it may concern:*

Be it known that I, WILLIAM A. RIDDELL, of Rochester, in the county of Monroe and State of New York, have invented certain new and useful Improvements in Focusing Devices for Cameras; and I do hereby declare the following to be a full, clear, and exact description of the same, reference being had to the accompanying drawings, forming a part of this specification, and to the reference-numerals marked thereon.

My present invention relates to photography and more particularly to photographic cameras and it has for its object to provide a simple and effective focusing device for moving the lens carriage back and forth on the bed which device will be so constructed as to be both inexpensive and easy to assemble.

The improvements are further directed toward providing a mechanism that is sightly and compact and that involves but a slight increase in the number of attachments necessarily provided on a camera bed.

To these and other ends the invention resides in certain improvements and combinations of parts all as will be hereinafter more fully described, the novel features being pointed out in the claims at the end of the specification.

In the drawings: Figure 1 is a top plan view of a camera and camera bed provided with a focusing device constructed in accordance with and illustrating one embodiment of my invention; Fig. 2 is a fragmentary bottom plan view of the bed plate with the cover plate removed; Fig. 3 is a detail perspective view of the focusing lever, and Fig. 4 is an enlarged transverse section through the bed taken substantially on the line 4—4 of Fig. 1.

Similar reference numerals throughout the several figures indicate the same parts.

My invention is more particularly applicable to cameras of the type known as folding pocket cameras especially when constructed of sheet metal as is generally the case and referring to Fig. 1, 1 indicates the body and 2 the bed of such a camera. In the present instance, the bed is provided with tracks 3 on or between which slides an extension bed 4 and slidable in turn upon this extension bed is the lens carriage 5 that is thus projected either by its individual movement or by being moved jointly with the extension bed.

The bed 2 consists of a plate having side flanges 6. It directly carries all of the various attachments that are necessary on a camera bed of this kind such as the hinges 7, the brackets 8 for the supporting links 9 and other parts. These are secured from the bottom which makes the under side of the plate unsightly and the latter is therefore concealed by a cover plate 10 having securing flanges 11 engaging over the flanges 6. The operation of applying the usual leather covering 12 to the outer or cover plate 10 and the operation of assembling the bed can therefore be conducted separately.

In the practice of my invention, I remove a segmental piece from the bed plate 2 to form an opening 13. At the narrow end of this opening, the adjoining portion of the plate is embossed or offset as at 14 and pivoted in the recess thus formed on the under side of the plate is a lever 15 turning on a rivet 16. The lever may turn through the arc defined by the segmental opening the sides of which form limiting stops and it will be observed that the major portion of it occupies the plane of the plate 2 between the cover plate 10 and the extension bed 4 running on top of the bed plate.

The pivot 16 is on one side of the extension bed and the lever passes across to the other side where it is offset at 16ª and provided with a finger portion 17. Adjacent to this finger portion is an indicator 18 that traverses a scale 19 graduated in terms of focal distance. A downwardly offset spring finger 19 preferably punched out of the material of the lever has a lip 20 that rides on the edge of the plate 2 at the margin of the opening 13 and this spring causes a tooth 21 on the lever to lock within an opening 22 in the scale 19 when the lever is swung to the limit of its movement in a direction toward the camera body.

At an intermediate point, the lever 15 is provided with a slot 23 that engages over a downwardly projecting pin 24 on the under side of the extension bed 4. It will therefore be seen that as the lever is swung back and forth, the extension bed 4 and with it the carriage 5 supporting the lens will be extended and retracted and in this way the proper focus is obtained.

It will be noted that very little of the lever 15 is in evidence and though it extends beneath the carriage and extension bed, the latter, the bed plate 2 and the cover plate 10 are as closely associated as they could be were the lever not there.

I claim as my invention:

1. In a focusing device for cameras, the combination with a camera bed having an opening therein, of a sliding lens carrying element mounted to rest against the top face of the bed and a lever arranged in the opening in the latter to vibrate in the same plane therewith and operatively connected to the lens carrying element to slide the same back and forth along the bed.

2. In a focusing device for cameras, the combination with a camera bed embodying a plate having an opening therein and carrying the camera attachments, of a cover plate fixed against the under side of the bed plate, a sliding lens carrying element mounted to rest against the top face of the bed plate, and a lever arranged in the opening in the latter to vibrate in the same plane therewith and operatively connected to the lens carrying element to slide the same back and forth along the bed.

3. In a focusing device for cameras, the combination with a camera bed embodying a plate having a segmental opening therein, of a sliding lens carrying element mounted to rest against the top face of the bed and a lever arranged in the opening in the latter to vibrate in the same plane therewith and to be limited in its movements by the walls of the opening, said lever being operatively connected to the lens carrying element to slide the same back and forth along the bed.

4. In a focusing device for cameras, the combination with a camera bed embodying a plate having an opening therein and an offset or embossed portion adjacent the opening, of a sliding lens carrying element mounted to rest against the top face of the bed and a lever arranged in the opening in the latter and pivoted to the embossed or offset portion thereof to vibrate in the plane of the bed plate, said lever being operatively connected to the lens carrying element to slide the same back and forth along the bed.

5. In a focusing device for cameras, the combination with a camera bed embodying a plate having a segmental opening therein and an offset or embossed portion adjacent to the narrow end of the opening, of a cover plate fixed against the under side of the bed plate, a sliding lens carrying element mounted to rest against the top face of the bed, and a lever arranged in the opening in the latter and pivoted beneath the embossed or offset portion thereof to vibrate in the plane of the bed plate between the cover plate and lens carrying element, said lever being operatively connected to the lens carrying element to slide the same back and forth along the bed.

WILLIAM A. RIDDELL.

Witnesses:
P. WESLEY HART,
F. M. PAGE.